US012642260B2

(12) United States Patent
Kaminou et al.

(10) Patent No.: US 12,642,260 B2
(45) Date of Patent: Jun. 2, 2026

(54) GUIDE FOR FISHING ROD

(71) Applicant: Shimano Inc., Sakai (JP)

(72) Inventors: Yoshiyuki Kaminou, Sakai (JP);
Kazuma Taniguchi, Sakai (JP)

(73) Assignee: Shimano Inc., Osaka (JP)

( * ) Notice: Subject to any disclaimer, the term of this
patent is extended or adjusted under 35
U.S.C. 154(b) by 175 days.

(21) Appl. No.: 17/719,924

(22) Filed: Apr. 13, 2022

(65) Prior Publication Data

US 2022/0394965 A1      Dec. 15, 2022

(30) Foreign Application Priority Data

Jun. 9, 2021    (JP) ................................. 2021-096527

(51) Int. Cl.
A01K 87/04          (2006.01)

(52) U.S. Cl.
CPC .................................... A01K 87/04 (2013.01)

(58) Field of Classification Search
CPC ...................................................... A01K 87/04
USPC ............................................................. 43/24
See application file for complete search history.

(56) References Cited

U.S. PATENT DOCUMENTS

| | | | | |
|---|---|---|---|---|
| 11,076,585 B2 * | 8/2021 | Akiba | ..................... | A01K 87/04 |
| 2009/0165355 A1 * | 7/2009 | Jeong | ..................... | A01K 87/04 |
| | | | | 242/157 R |

| | | | | |
|---|---|---|---|---|
| 2011/0010922 A1 * | 1/2011 | Jeong | ..................... | A01K 87/04 |
| | | | | 29/530 |
| 2019/0008129 A1 * | 1/2019 | Akiba | ..................... | A01K 87/04 |
| 2019/0029240 A1 * | 1/2019 | Akiba | ..................... | A01K 87/04 |
| 2022/0394964 A1 * | 12/2022 | Kaminou | ............... | A01K 87/04 |

FOREIGN PATENT DOCUMENTS

| | | | | | |
|---|---|---|---|---|---|
| JP | S6133900 Y2 | * | 10/1986 | | |
| JP | H1042753 A | * | 2/1998 | | |
| JP | 10-234269 A | | 9/1998 | | |
| JP | H10234269 A | * | 9/1998 | | |
| JP | H11225628 A | * | 8/1999 | | |
| JP | 2011067165 A | * | 4/2011 | | |
| JP | 2011223918 A | * | 11/2011 | | |
| JP | 2011239776 A | * | 12/2011 | | |
| JP | 2012075375 A | * | 4/2012 | | |
| JP | 2015146766 A | * | 8/2015 | | |
| JP | 2016015950 A | * | 2/2016 | | |
| JP | 2016149993 A | * | 8/2016 | | |
| JP | 2017000067 A | * | 1/2017 | ............. | A01K 87/04 |
| JP | 2017-46646 A | | 3/2017 | | |
| JP | 2017046640 A | * | 3/2017 | ............. | A01K 87/04 |
| JP | 2017046646 A | * | 3/2017 | ............. | A01K 87/04 |

(Continued)

*Primary Examiner* — Darren W Ark
(74) *Attorney, Agent, or Firm* — Spencer Fane, LLP

(57)          ABSTRACT

A guide for a fishing rod, includes a rod body, a guide ring
configured to have a fishing line inserted therethrough,
including an outer circumferential groove along an outer
peripheral edge located outside of the central axis in a radial
direction of the rod, a guide frame fixed to the rod body
extending outwardly in a radial direction of the rod and
which has a frame including a ring-shaped wire material that
holds the guide ring, and a bonding assisting aid having a
first bonding portion bonded to the outer circumferential
groove, and a second bonding portion bonded to an inner
circumferential surface of the frame.

6 Claims, 6 Drawing Sheets

(56)             References Cited

FOREIGN PATENT DOCUMENTS

| | | | | | |
|---|---|---|---|---|---|
| JP | 6553455 | B2 | * | 7/2019 | ............ A01K 87/04 |
| JP | 2019110812 | A | * | 7/2019 | |
| JP | 2020022384 | A | * | 2/2020 | |
| KR | 100952432 | B1 | * | 4/2010 | ............ A01K 87/04 |
| KR | 20140032742 | A | * | 3/2014 | |
| WO | WO-2012060122 | A1 | * | 5/2012 | ............ A01K 87/04 |
| WO | WO-2016160879 | A1 | * | 10/2016 | ............ A01K 87/04 |
| WO | WO-2017130470 | A1 | * | 8/2017 | ............ A01K 87/04 |
| WO | WO-2017149832 | A1 | * | 9/2017 | ............ A01K 87/02 |

* cited by examiner

GUIDE FOR FISHING ROD

CROSS-REFERENCE TO RELATED APPLICATIONS

This application claims priority to Japanese Patent Application No. 2021-096527, filed on Jun. 9, 2021. The entire disclosure of Japanese Patent Application No. 2021-096527 is hereby incorporated herein by reference.

BACKGROUND

Field of the Invention

The present invention relates to a guide for a fishing rod.

Background Art

Conventional guides for a fishing rods are known from in prior art which comprise a guide ring through which a fishing line is inserted, and a guide frame that holds the guide ring and that is fixed to the body of the rod and extends outwardly in the radial direction of the rod, wherein the guide frame has a frame part composed of ring-shaped wire rod that holds the guide ring (for example, refer to Japanese Laid-Open Patent Publication No. 2015-146766 and Japanese Patent No. 6553455).

Japanese Laid-Open Patent Publication No. 2015-146766 discloses a configuration in which the outer circumferential surface of a guide ring is a flat surface, and a D-cut shaped flat portion is formed in the corresponding portion of the inner circumferential surface of the frame.

Further, Japanese Patent No. 6553455 discloses a configuration in which a curved peripheral groove is formed in the outer circumferential surface of a guide ring, and includes a frame formed from a metal wire rod with a circular cross section that holds the guide ring.

SUMMARY

It has been determined however that in the above-mentioned guide for a fishing rod shown in Japanese Laid-Open Patent Publication No. 2015-146766, although it is possible to improve the attachment force to a certain extent by increasing the contact area between the D-cut shaped flat surface of the frame and the outer circumferential surface of the guide ring, the contact area cannot be increased beyond the area of the flat surface.

Moreover, in the above-mentioned guide for a fishing rod shown in Japanese Laid-Open Patent Publication No. 2015-146766, it is necessary to change the cross-sectional shape of the frame itself, so that processing is labor and cost intensive.

In Japanese Patent No. 6553455, it has been determined that it is necessary to match the shapes of the curved outer circumferential surface of the frame and the curved surface of the peripheral groove; if the shapes of the two (for example, the outer diameter) are different, it is not possible to adequately secure the contact area between the two, so that it is not possible to obtain the desired fixing force.

In addition, in Japanese Patent No. 6553455, there are cases in which the shape of the frame (diameter and size) is larger than required to match the shape (size) of the peripheral groove, which increases the overall weight of the guide frame; thus, there is room for improvement in this regard.

Embodiments of the present invention were conceived in light of these circumstances, and one object thereof is to provide a guide for a fishing rod that facilitates positioning between the frame and the guide ring, which prevents a reduction in the fixing force of both, and which can realize a reduction in weight.

A guide for a fishing rod according to an embodiment of the present invention comprises a guide ring, through which a fishing line is inserted, with an outer circumferential groove along the outer peripheral edges located outside of the central axis in the radial direction of the rod; a guide frame, which is fixed to the rod body extending outwardly in a radial direction of the rod and which has a frame composed of a ring-shaped wire material that holds the guide ring, and a bonding assisting aid that has a first bonding portion that is bonded to the outer circumferential groove, and a second bonding portion that is bonded to the inner circumferential surface of the frame.

By the guide for a fishing rod according to this embodiment of the present invention, the bonding assisting aid bonds to the outer circumferential groove of the guide ring and the inner circumferential surface of the frame, at the first and second bonding portions, respectively, thereby fixing the guide ring to the frame. As a result, it is possible to change the shape of the bonding assisting aid and have a large contact area between the outer circumferential groove and the inner circumferential surface of the frame, and to increase the adhesive force between the inner circumferential surface of the frame and the outer circumferential groove, thereby enhancing the fixing force of both. That is, even if the shape of the outer circumferential groove and the shape of the inner circumferential surface of the frame differ, by interposing the bonding assisting aid, a contact area and the desired fixing force can be obtained.

Moreover, in this embodiment of the present invention, since there is no need to use a frame that is larger than necessary to match the outer circumferential groove, it is possible to suppress or avoid an increase in the overall weight of the guide frame.

In addition, by the guide for a fishing rod according to this embodiment of the present invention, since it is possible to suppress or avoid an increase in the size of the outer shape of the frame, it is possible to house and fix a portion of the frame in the outer circumferential groove of the guide ring. As a result, the overhanging part of the frame that protrudes from the outer circumferential groove can be minimized, and it is possible to prevent breakage of the frame at the part that protrudes from the outer circumferential groove, which could potentially tangle the fishing line in the overhanging portion, and cause the pooling of salt water due to adhesion of seawater, as has been found in the prior art.

The first bonding portion preferably has a shape that follows the outer circumferential groove and is in frictional contact with the outer circumferential groove, and the second bonding portion preferably has a shape that follows the shape of the inner circumferential surface of the frame and is in frictional contact with the inner circumferential surface of the frame.

In this embodiment, because the bonding assisting aid is fixed to the outer circumferential groove of the guide ring and the frame by frictional contact, it is possible to increase the adhesive force between the frame and the outer circumferential groove and enhance the fixing force of both.

The first bonding portion can oppose the outer circumferential groove with a space for a filling area of the adhesive therebetween, and the second bonding portion is preferably formed into a shape that follows the shape of the inner circumferential surface of the frame and is in frictional contact with the inner circumferential surface of the frame.

In this embodiment, it is possible to secure a large space (area) between the guide ring and the frame, which makes it possible to fill the space (area) with, for example, an adhesive, and thus increase the adhesive force between the first bonding portion and the outer circumferential groove, thereby enhancing the fixing force of both.

The cross-sectional shape of the outer circumferential groove in the central axis direction of the guide ring is a curved surface recessed in the central axis direction, the first bonding portion has a planar shape that opposes the outer circumferential groove of the guide ring, and the first bonding portion can have a filling area for the adhesive between the first bonding portion and the outer circumferential groove.

By such a configuration, it is possible to secure a sufficient space (filling area) between the outer circumferential groove and the first bonding portion having a rectangular cross section. By filling this filling area with an adhesive, the fixing force between the first bonding portion and the outer circumferential groove can be further enhanced.

The bonding assisting aid can be provided so as to cover the entire cross section of the frame.

In this embodiment, the bonding assisting aid, which is a different member than the wire material of the frame, can be fixed to and cover the wire material, thus the bonded state between the bonding assisting aid and the frame is stronger, and the fixing force between the bonding assisting aid and the outer circumferential groove can be further enhanced.

The bonding assisting aid can be configured such that the wire material of the frame is inserted therein, and the cross-sectional shape is formed in a rectangular shape.

In this embodiment, because the rectangular bonding assisting aid has, for example, a rectangular cross-sectional shape, it is possible to increase the surface area of the portion of the bonding assisting aid housed in the outer circumferential groove and to obtain a large contact area between the bonding assisting aid and the outer circumferential groove. As a result, it is possible to increase the adhesive force between the bonding assisting aid and the outer circumferential groove and enhance the fixing force of both.

In addition, by making the bonding assisting aid and the wire material separate members, a thin wire material can be applied to the frame, thereby reducing costs.

In addition, in this embodiment of the present invention, a material different than that of the frame and the guide ring can be employed for the bonding assisting aid, so that by using, for example, a material with good adhesion, the fixing force between the guide ring and the frame can be enhanced.

By the guide for a fishing rod according to embodiments of the present invention, positioning between the frame and the guide ring is a simple matter, a decrease in the fixing force of both can be prevented, and a weight reduction can be achieved.

DETAILED DESCRIPTION OF EMBODIMENTS

An embodiment of the guide for a fishing rod according to the present invention will be explained below with reference to the drawings. In each of the drawings, there are cases in which the scale of each component member has been appropriately changed as required to improve the visualization of the component member.

First Embodiment

Figure 1:
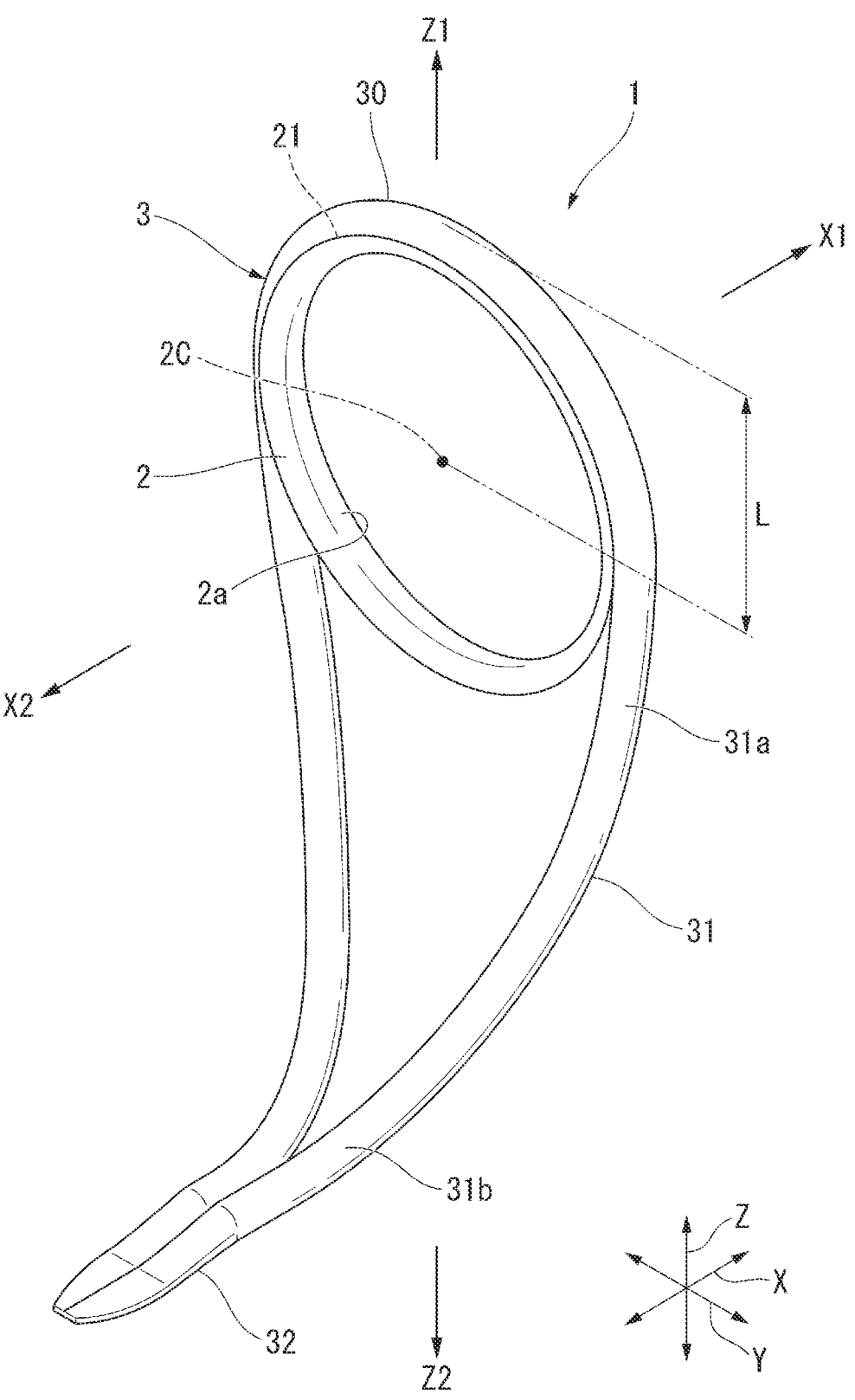
FIG. 1 is a front view of a guide for a fishing rod according to a first embodiment of the present invention.
Figure 2:
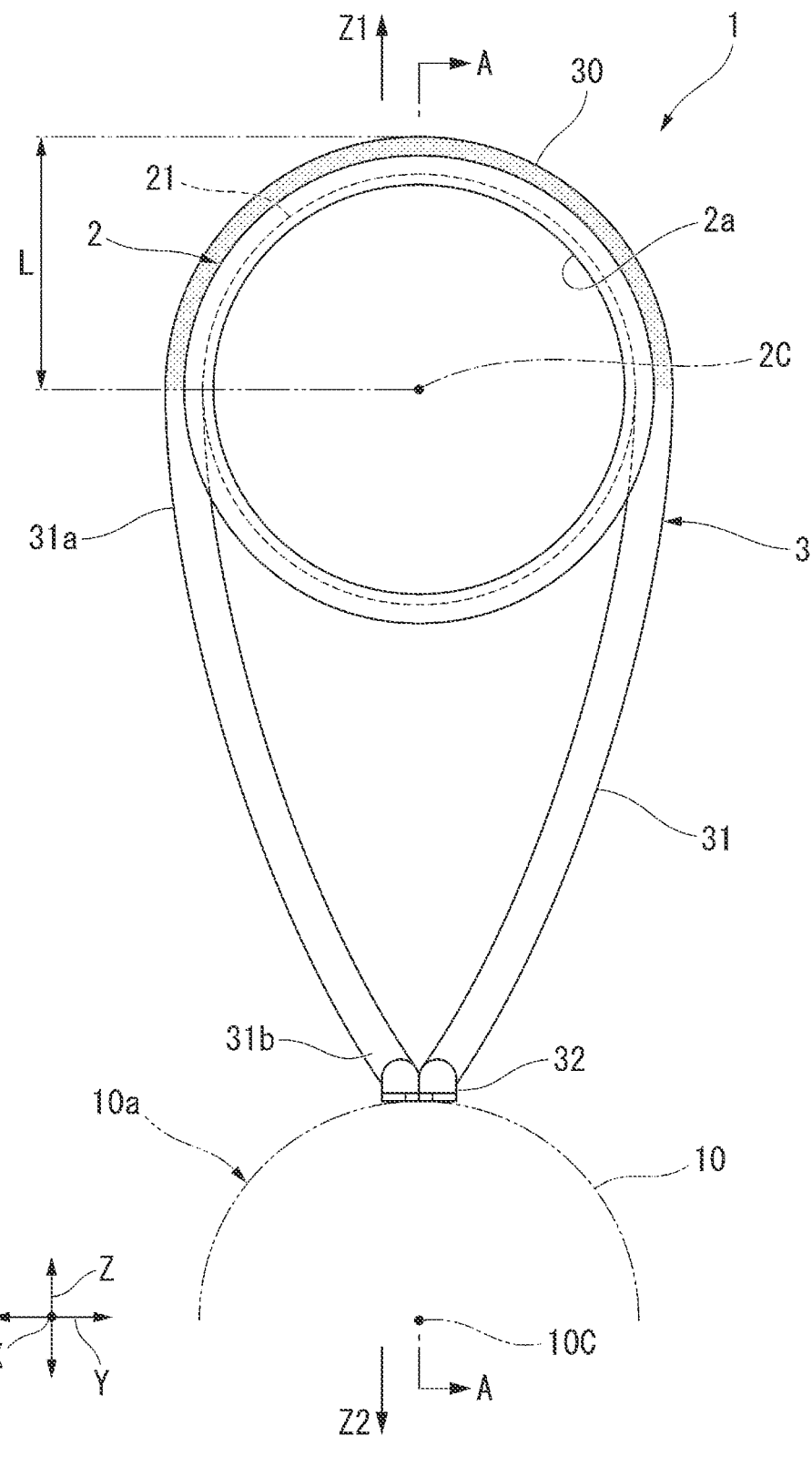
FIG. 2 is a front view of the guide for a fishing rod as viewed from a direction of the central axis of a guide ring.
Figure 3:
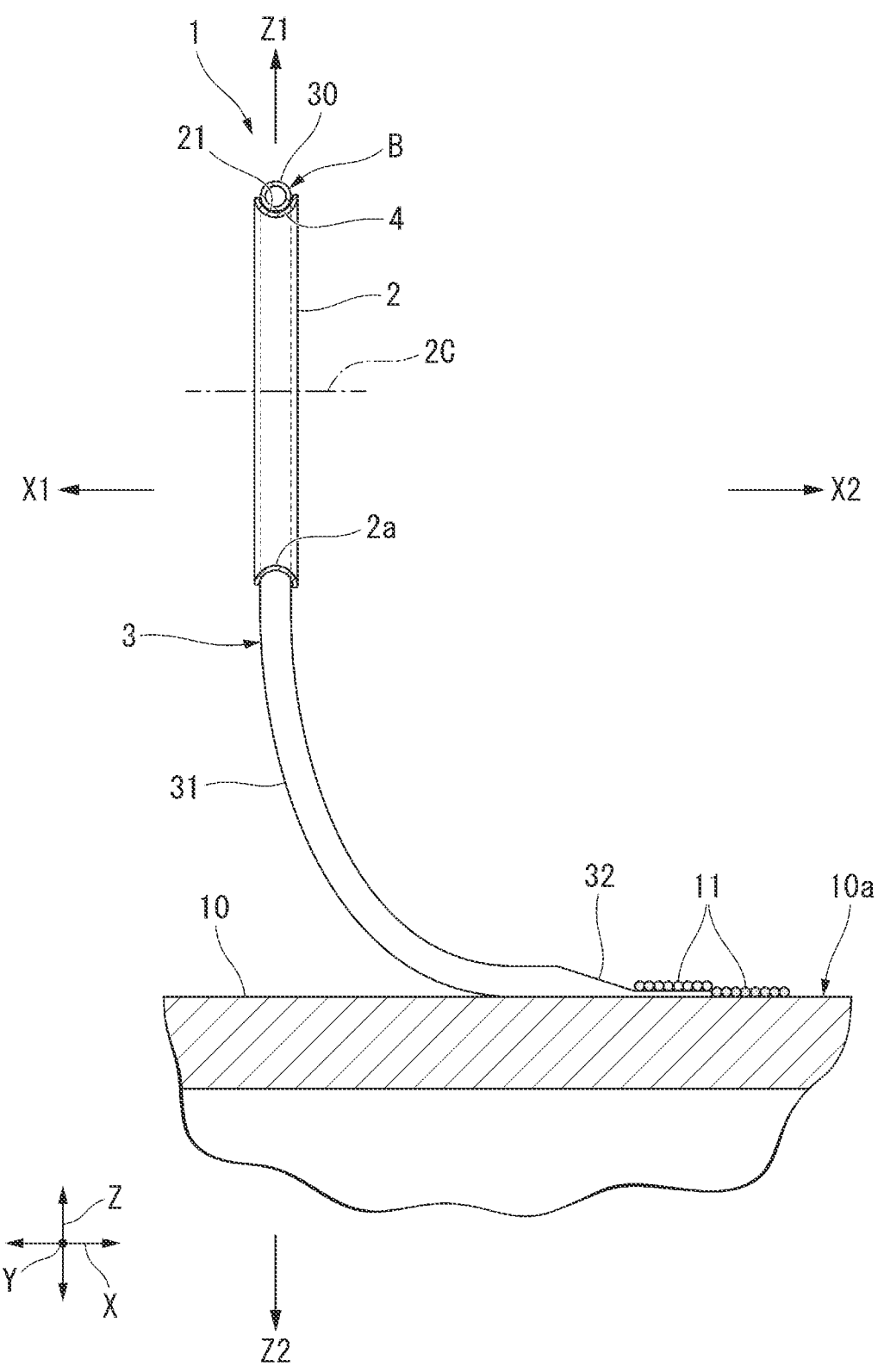
FIG. 3 is a cross-sectional view along line A-A shown in FIG. 2 of the guide for a fishing rod as viewed from the left-right direction.

As shown in FIGS. 1 to 3, a guide for a fishing rod 1 according to the present embodiment is a guide member that is fixed to an outer circumferential surface 10a of the rod body 10 of a fishing rod, and holds a guide ring 2 through which a fishing line is inserted. A plurality of the guides for a fishing rod 1 are arranged on the outer circumferential surface 10a of the rod body 10 at prescribed intervals in the axial direction of the rod.

The guide for a fishing rod 1 has the guide ring 2 through which a fishing line is inserted and guides the fishing line, a guide frame 3 that is fixed to the rod body 10, that extends outwardly in the radial direction of the rod, and that holds the guide ring 2, and a spacer 4 (bonding assisting aid) that is interposed between the guide ring 2 and the guide frame 3 in a state of being bonded to both.

Here, in the guide for a fishing rod 1 shown in the drawings, the axial direction of the rod body 10 is referred to as the front-rear direction X, the rod tip side (front side) is indicated by reference symbol X1, and the rod tail side (rear side) is indicated by the reference symbol X2. Further, a direction orthogonal to the axial direction of the rod body 10 on a plane that passes through central axis 2C of the guide ring 2 is defined as the vertical direction Z, a direction away from the rod body 10 is defined as the upper side, indicated by the reference symbol Z1, and the direction approaching the rod body 10 is defined as the lower side, indicated by reference symbol Z2. The upper side Z1 can be referred to as the distal end side, and the lower side Z2 can be referred to as the proximal end side. Further, the direction orthogonal to the axial direction of the rod body 10 in a plan view seen from the upper side Z1 is defined as the left-right direction Y. The axial direction (front-rear direction X) of the rod body 10 is the direction of central axis 10C of the rod body 10, the longitudinal direction of a mounting leg portion 32 of the guide frame 3, described further below, and the left-right direction Y is the lateral direction (width direction) of the mounting leg portion 32. Further, in the following description, a direction around central axis 2C when the guide ring 2 is viewed from the central axis 2C direction is defined as the circumferential direction, and a direction orthogonal to central axis 2C is defined as the radial direction.

Guide Ring

The guide ring 2 has an outer circumferential groove 21 along an outer peripheral edge positioned on the outer side of central axis 2C of the guide ring 2 in the radial direction of the rod, and is held coaxially with a frame 30 of the guide frame 3, described further below. That is, the fishing line slides on an inner circumferential surface 2a of the guide ring 2, which thereby directly guides the fishing line.

The guide ring 2 is annularly shaped material, such as titanium, aluminum, SUS, or ceramic, having a low sliding resistance for the fishing line on the guide surface on the inner circumferential side of the ring. In the present embodiment, the guide ring 2 has a circular annular shape, for example, but can have an elliptical shape, an oval shape, or the like. The guide ring 2 is formed, for example, by pressing a metal plate into a prescribed shape.

Figures 4A, 4B:
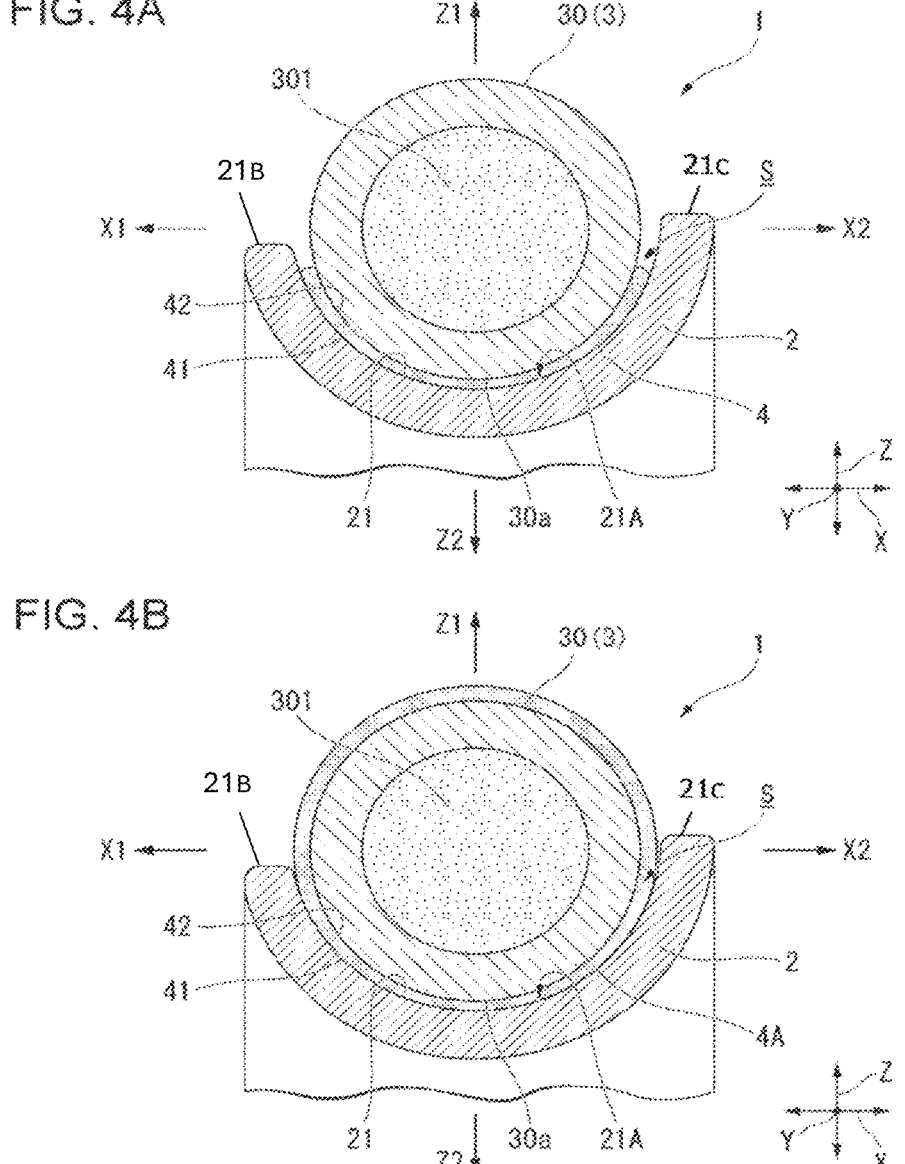
FIG. 4A is an enlarged view of portion B shown in FIG. 3, and a cross-sectional view showing a fixed state of a frame and the guide ring, and 4B is a cross-sectional view showing the fixed state of the guide ring and the frame, including a spacer according to a modified example.

As shown in FIG. 4A, the inner circumferential surface 2a of the guide ring 2 has a curved surface that is curved in the front-rear direction X so as to have a convex shape on the inner side (central axis 2C side shown in FIG. 2) as seen in cross section. The outer circumferential groove 21 of the guide ring 2 has a curved concave surface 21A that opposes at least a portion of the frame 30 (described further below). The curved concave surface 21A has a concave portion that is recessed toward the center direction (central axis 2C side) of the guide ring 2.

In a cross-sectional view along the vertical direction Z, the guide ring 2 has the convex inner circumferential surface 2a that is curved in an arc shape such that the central axis 2C side is convex, and a concave outer circumferential surface (outer circumferential groove 21) that is curved in an arc shape such that the central axis 2C side is convex.

Specifically, the outer circumferential groove 21 of the guide ring 2 has flange portions 21b, 21c, in which both sides of a bottom portion 21a of the central portion in the front-rear direction X respectively protrude radially outward as seen in cross section. As a result, the concave outer circumferential groove 21 is formed over the entire circumference of the outer circumferential surface of the guide ring 2 between the two flange portions 21b, 21c.

The frame 30 of the guide frame 3 is engaged with the outer circumferential groove 21 of the guide ring 2 between the two flange portions 21b, 21c, within an angular range of about 180 degrees from the central axis 2C to the upper side Z1 of the entire circumference of the circular cross section of the guide ring 2.

Guide Frame

As shown in FIGS. 1 to 3, the guide frame 3 includes the frame 30 composed of a ring-shaped wire material that holds the guide ring 2, a supporting leg portion 31 that is fixed to the rod body 10 and is connected to and supports the frame 30, and the mounting leg portion 32 that is connected to the supporting leg portion 31 and that is fixed to the outer circumferential surface 10a of the rod body 10.

The guide frame 3 is fixed to the outer circumferential surface 10a of the rod body 10 in a state in which the frame 30 is oriented toward the rod tip side (front side X1) with respect to the mounting leg portion 32. Here, the mounting leg portion 32 extends in the front-rear direction X.

The guide frame 3 curves from the front-end portion of the mounting leg portion 32 toward the upper side Z1, and then extends linearly to the upper side Z1. The portion of the guide frame 3 that curves toward the upper side Z1 is the supporting leg portion 31. In the present embodiment, the supporting leg portion 31 stands up perpendicularly with respect to the mounting leg portion 32, and the central axis 2C of the guide ring 2 is parallel to the central axis 10C of the rod body 10, but the supporting leg portion 31 can stand up with an incline such that the central axis 2C of the guide ring 2 is not parallel to the central axis 10C of the rod body 10. For example, the supporting leg portion 31 can be configured to stand up in a forward leaning attitude.

The supporting leg portion 31 is positioned between the frame 30 and the mounting leg portion 32 and connects the frame 30 and the mounting leg portion 32. As shown in FIG. 1, the supporting leg portion 31 has a two-legged configuration, in which two legs are arranged next to each other on the left and right. The left and right pair of the support leg portions 31 are bilaterally symmetric. The left and right pair of the support leg portions 31 respectively extend downward from both end portions of the frame 30 in the circumferential direction, forming an overall V shape when seen from the front or rear.

The left and right pair of the support leg portions 31 extend linearly along a tangent line, with both end portions of the frame 30 in the circumferential direction as tangent points, and also extend inwardly in the left-right direction Y so as to gradually approach each other, i.e., such that the interval between the two portions narrows, as they approach the mounting leg portion 32, and contact each other at the lower end portion.

An upper end portion 31a of the supporting leg portion 31 is located on a plane that is orthogonal to the central axis of the frame 30 (central axis 2C of the guide ring 2).

The mounting leg portion 32 extends in a straight line in a plan view from the lower end portion of the supporting leg portion 31 toward a rear side X2 (rod tail side). In the present embodiment, the mounting leg portion 32 has a two-legged configuration, composed of prescribed length regions at both end portions of one metal wire material. That is, the mounting leg portion 32 is configured such that a left and right pair of linear bodies, formed of the prescribed length regions at both ends of one metal wire material, are aligned in parallel to the left and right, and each linear body extends rearward from a lower end portion 31b of the supporting leg portion 31. The left and right pair of linear bodies are joined to each other and integrated. While any joining method can be employed, welding is preferable.

The mounting leg portion 32 is wound around the outer circumferential surface 10a of the rod body 10 by a winding thread 11, as shown in FIG. 3.

The frame 30 is supported by the supporting leg portion 31 at a position away from the outer circumferential surface 10a of the rod body 10, and holds the guide ring 2, which guides a fishing line, on the inner circumferential surface thereof. The frame 30 is made of a metal wire material that is bent into a U shape, and the two end portions thereof in the circumferential direction are respectively connected to the upper end portions 31a of the pair of support leg portions 31. The frame 30 engages the outer circumferential groove 21 formed on the outer circumferential surface of the guide ring 2, and thereby hold the guide ring 2 on the inner circumferential surface of the frame 30.

The metal wire material constituting the frame 30 is made from a titanium alloy, stainless steel, or an aluminum alloy, for example. Specifically, titanium alloy is preferable from the standpoint of weight reduction. The metal wire material has a circular cross section. The frame 30 employed in the present embodiment is solid, and is filled with a filler 301, such as a resin material.

From the standpoint of realizing both weight reduction and improved strength, and to easily secure a contact area with the guide ring 2, a hollow, linear tubular material is preferable as the metal wire material of the frame 30, which can have a cavity without a filler. The wire diameter (outer diameter) of the metal wire material to be employed can be approximately 0.3 to 6 mm, for example.

As shown in FIG. 4A, the frame 30 has an inner circumferential portion that is accommodated in the outer circumferential groove 21 of the guide ring 2, and is integrally bonded to the guide ring 2 via the spacer 4 serving as the bonding assisting aid interposed in a space S that is formed with the outer circumferential groove 21.

The outer diameter of the frame 30 is smaller than the internal diameter of the outer circumferential groove 21 of the guide ring 2. The circumferential surface of the inner circumferential side (inner circumferential surface 30*a*) of the frame 30 opposes the curved concave surface 21A formed on the outer circumferential groove 21 at a pre-scribed interval (space S) in a state of entering within the outer circumferential groove 21 of the guide ring 2. The spacer 4 is disposed in the space S between the inner circumferential surface 30*a* of the frame 30 and the outer circumferential groove 21 of the guide ring 2.

The spacer 4 serving as the bonding assisting aid has an outer peripheral bonding surface 41 (first bonding portion) that is bonded to the outer circumferential groove 21 and an inner peripheral bonding surface 42 (second bonding portion) that is bonded to the inner circumferential surface 30*a* of the frame 30 and is curved so as to be convex radially inward as seen in cross section.

The outer peripheral bonding surface 41 has a shape that follows the outer circumferential groove 21 and is in frictional contact with the curved concave surface 21A of the outer circumferential groove 21. The outer peripheral bonding surface 41 is bonded to the outer circumferential groove 21 by an adhesive. The outer peripheral bonding surface 41 can be disposed to face the outer circumferential groove 21 with the filling area for the adhesive therebetween.

The inner peripheral bonding surface 42 has a shape that follows the inner circumferential surface 30*a*, which is the shape of the inner circumferential surface of the frame 30, and is in frictional contact with the inner circumferential surface 30*a* of the frame 30. The inner peripheral bonding surface 42 is bonded to the inner circumferential surface 30*a* of the frame 30 by an adhesive. The inner peripheral bonding surface 42 can be disposed to face the inner circumferential surface 30*a*, with a filling area for the adhesive therebe-tween.

As for the assembly method for fixing the guide ring 2 to the frame 30, the adhesive is applied to or filled into the curved concave surface 21A of the outer circumferential groove 21 of the guide ring 2. The spacer 4 is then disposed in the curved concave surface 21A, and the adhesive is applied to or filled into the inner peripheral bonding surface 42 of the spacer 4. Thereafter, the inner circumferential surface 30*a* of the frame 30 is engaged with the inner peripheral bonding surface 42 of the spacer 4. By curing the adhesive, the outer circumferential groove 21 of the guide ring 2 is fixed to the inner circumferential surface 30*a* of the frame 30 and assembled.

In the present embodiment, the spacer 4 is disposed in a portion of the space between the inner circumferential surface 30*a* of the frame 30 and the outer circumferential groove 21 of the guide ring 2, but, for example, as shown in FIG. 4B, a spacer 4A (bonding assisting aid) having a cylindrical (tubular) shape covering the entire circumference of the frame 30 can be used. The spacer 4A shown in FIG. 4B functions as a cover that protects the frame 30.

The operation of the guide for a fishing rod configured in this manner will now be described in detail with reference to the drawings.

In the present embodiment, as shown in FIG. 4A, the spacer 4 is bonded to the outer circumferential groove 21 of the guide ring 2 and the inner circumferential surface 30*a* of the frame 30, i.e., the outer peripheral bonding surface 41 and the inner peripheral bonding surface 42 of the spacer 4 are used to fix the guide ring 2 to the frame 30. As a result, it is possible to change the shape of the spacer 4 to thereby obtain a large contact area between the outer circumferential groove 21 and the inner circumferential surface 30*a* of the frame 30, and to increase the adhesive force between the inner circumferential surface 30*a* of the frame 30 and the outer circumferential groove 21 and enhance the attachment force of both. That is, even if the shape of the outer circumferential groove 21 and the shape of the inner cir-cumferential surface of the frame 30 differ, by interposing the spacer 4, contact area can be secured, and the desired attachment force can be obtained. Further, in the present embodiment, since it is not necessary to use a frame 30 that is larger than required to match the outer circumferential groove 21, it is possible to suppress or avoid an increase in the overall weight of the guide frame 3.

Further, by embodiments of the present embodiment, since it is possible to reduce the size of the outer area of the frame 30, it is possible to house and fix a portion of the frame 30 in the outer circumferential groove 21 of the guide ring 2. As a result, the overhanging part of the frame 30 that protrudes from the outer circumferential groove 21 can be minimized, and it is possible to prevent breakage of the frame 30 at the portion protruding from the outer circum-ferential groove, tangling of the fishing line in the overhang-ing portion, and pooling of salt water due to adhering seawater, as has been found to occur in the prior art.

Further, the present embodiment is configured such that the outer peripheral bonding surface 41 of the spacer 4 has a shape that follows the outer circumferential groove 21 and is in frictional contact with the outer circumferential groove 21, and the inner peripheral bonding surface 42 has a shape that follows the shape of the inner circumferential surface 30*a* of the frame 30 and is in frictional contact with the inner circumferential surface 30*a* of the frame 30. As a result, since the spacer 4 is fixed to the outer circumferential groove 21 of the guide ring 2 and the frame 30 by frictional contact, it is possible to further increase the adhesive force of both and enhance the fixing force.

Further, the present embodiment is configured such that the outer peripheral bonding surface 41 of the spacer 4 opposes the outer circumferential groove 21 with a space for a filling area of the adhesive therebetween, and the inner peripheral bonding surface 42 has a shape that follows the shape of the inner circumferential surface 30*a* of the frame 30 and is in frictional contact with the inner circumferential surface 30*a* of the frame 30. As a result, it is possible to obtain a large space S (area) between the guide ring 2 and the frame 30, which makes it possible to fill the space S with, for example, an adhesive, to thereby increase the adhesive force between the outer peripheral bonding surface 41 and the outer circumferential groove 21 and to enhance the fixing force of both.

By the guide for a fishing rod according to the first embodiment configured in the manner described above, positioning between the frame 30 and the guide ring 2 is a simple matter, reduction in the fixing force of both members can be prevented, and weight reduction can be achieved.

Second Embodiment

Figure 5:
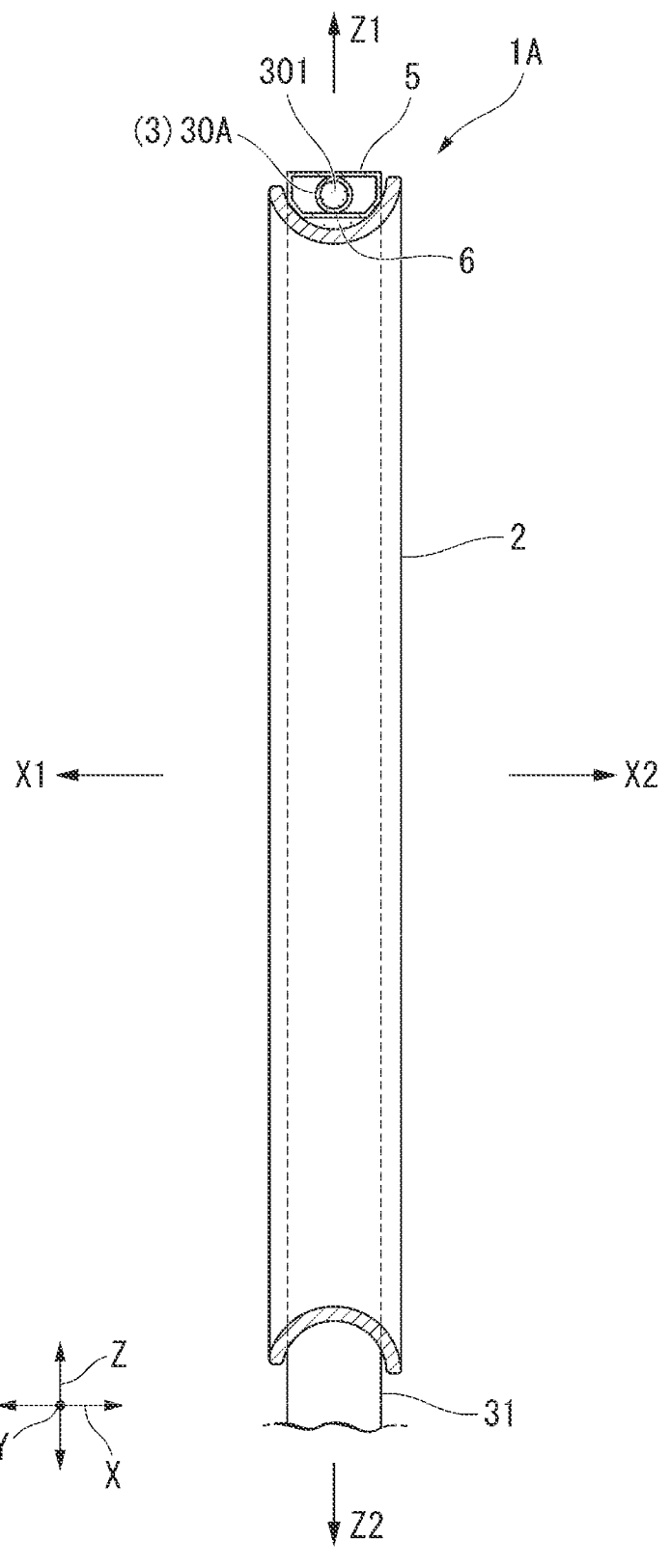
FIG. 5 is a side view showing a configuration of the guide for a fishing rod according to a second embodiment.
Figure 6:
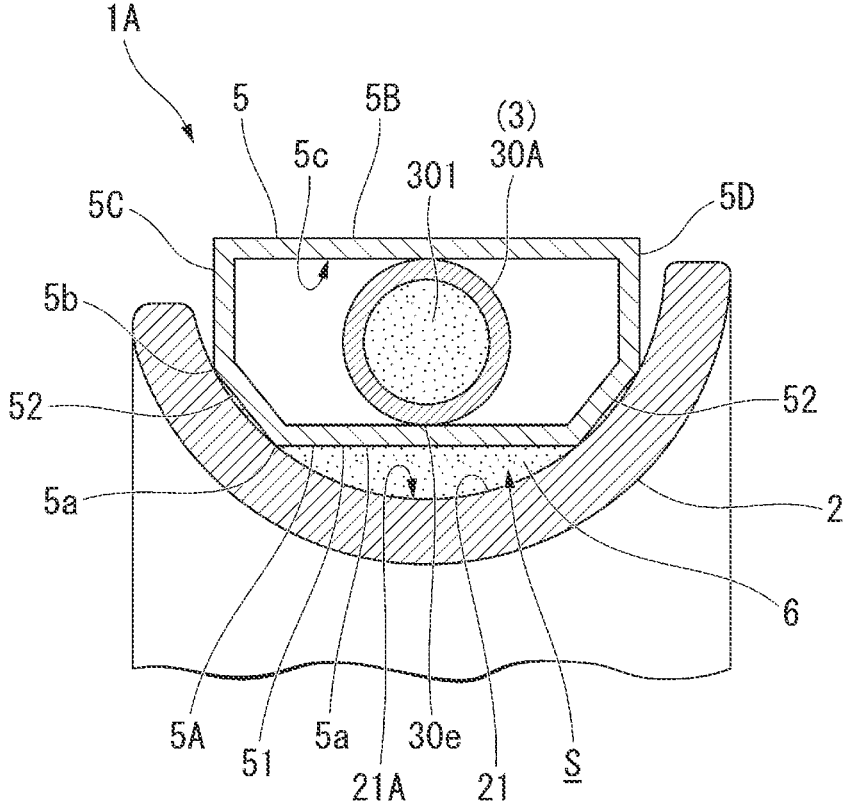
FIG. 6 is a cross-sectional view showing the fixed state of the frame and the guide ring in the guide for a fishing rod shown in FIG. 5.

A guide for a fishing rod 1A according to a second embodiment shown in FIGS. 5 and 6 is configured such that a frame 30A is made from a metal wire material with a circular cross section and has a sleeve 5 (bonding assisting aid) that houses a portion of the frame 30A.

The guide ring 2 according to the second modified example is configured to have the same outer circumferential groove 21 in which is formed the same curved concave surface 21A as in the embodiment described above, so that a detailed description thereof will be omitted.

A solid metal wire material formed by filling a tubular pipe material with the filler 331, such as resin, is employed as the frame 30A. Further, the frame 30A has approximately the same cross-sectional shape over its entire length.

As shown in FIG. 6, the sleeve 5 as the bonding assisting aid is formed with an essentially rectangular shape having a hollow through-hole 5c that is long in the front-rear direction X as seen in cross section. The frame 30A is inserted and accommodated in the inner side of the through-hole 5c. That is, the sleeve 5 extends along the frame 30A in a U shape. The sleeve 5 is provided so as to cover the entire cross section of the frame 30A.

The sleeve 5 has an inner peripheral portion that is disposed in the outer circumferential groove 21 of the guide ring 2 and is integrally connected to the guide ring 2 by the adhesive 6 filling the space S that is formed between the sleeve 5 and the outer circumferential groove 21.

In this second embodiment, the sleeve 5 has the through-hole 5c, but it is not limited to having the through-hole 5c, and a groove that can engage the frame 30A can be provided instead, for example.

Further, in the present second embodiment, the inside of the through-hole 5c of the sleeve 5 is hollow, but can be filled with a lightweight material, such as a foaming agent, to thereby hold the frame 30A inside the through-hole 5c of the sleeve 5.

The sleeve 5 has an inner peripheral wall 5A, an outer peripheral wall 5B, a front wall 5C, and a rear wall 5D. Further, the sleeve 5 has almost the same cross-sectional shape over its entire length. That is, the inner peripheral wall 5A is disposed over the entire semi-circumferential portion (the range of L shown in FIGS. 1 and 2) on the side away from the rod body 10, but can be disposed in any part of the semi-circumferential portion.

An inner circumferential surface 5a (first bonding portion) of the inner peripheral wall 5A in the sleeve 5 opposes the curved concave surface 21A formed on this outer circumferential groove 21 when entering within the outer circumferential groove 21 of the guide ring 2. The inner circumferential surface 5a of the inner peripheral wall 5A has a planar shaped portion 51 along the direction of the central axis 2C of the guide ring 2 as seen in cross section. Tapered surfaces 52 are formed on both sides (front side X1, rear side X2) of the planar shaped portion 51 in the front-rear direction X, respectively connected to the front wall 5C and the rear wall 5D. Portions of the two tapered surfaces 52 (corners 52a, 52b of the tapered surfaces 52) of the sleeve 5 are in contact with the curved concave surface 21A of the outer circumferential groove 21.

A hole inner surface 5b (second bonding portion) located on the side of the through-hole 5c of the inner peripheral wall 5A in the sleeve 5 is bonded to an outer circumferential surface 30e of the frame 30A, which is inserted in the through-hole 5c, by an adhesive, or the like.

In this manner, the inner circumferential surface 5a of the sleeve 5 and the curved concave surface 21A of the outer circumferential groove 21 are shaped differently from each other. That is, in the guide for a fishing rod 1A according to the second modified example, the space S (filling area) is formed between the curved concave surface 21A of the curved guide ring 2 and the inner circumferential surface 5a formed from three planes (the planar shaped portion 51 and the pair of tapered surfaces 52, 52) of the sleeve 5. This space S is filled with the adhesive 6. The guide ring 2 is fixed to the frame 30A via the sleeve 5 by the adhesive 6.

In the above-described second embodiment, the sleeve 5, which is a different member than the wire material of the frame 30A, can be fixed to and cover the wire material, the bonded state between the sleeve 5 and the frame 30A is stronger, and the fixing force between the sleeve 5 and the outer circumferential groove 21 can be further enhanced.

Further, in the present second embodiment, because the rectangular sleeve 5 has, for example, a rectangular cross-sectional shape, it is possible to increase the surface area of the portion of the sleeve 5 accommodated in the outer circumferential groove 21, and to obtain a large contact area between the sleeve 5 and the outer circumferential groove 21. As a result, it is possible to increase the adhesion force between the sleeve 5 and the outer circumferential groove 21, and to enhance the fixing force of both.

Further, by making the sleeve 5 and the wire material separate members, a thin wire material can be applied to the frame 30A, thereby reducing costs.

Further, in the present second embodiment, a material different from that of the frame 30A and the guide ring 2 can be employed for the sleeve 5, so that by using, for example, a material with good adhesion, the fixing force with the guide ring 2 and the frame 30A can be enhanced.

Further, in the second embodiment, the cross-sectional shape of the guide ring 2 of the outer circumferential groove 21 in the direction of central axis 2C is a curved surface recessed in the central axis direction, the inner circumferential surface 5a of the sleeve 5 has a planar shape that opposes the outer circumferential groove 21 of the guide ring 2, and the outer circumferential groove 21 and the inner circumferential surface 5a of the sleeve 5 has a filling area for the adhesive 6 therebetween. As a result, it is possible to secure a sufficient space (filling area) between the outer circumferential groove 21 and the inner circumferential surface 5a of the sleeve 5 having a rectangular cross section. By filling this filling area with the adhesive 6, the fixing force between the inner circumferential surface 5a and the outer circumferential groove 21 can be further enhanced.

Although embodiments of the guide for a fishing rod according to the present invention have been described, these embodiments have been presented only as examples and are not intended to limit the scope of the invention. The embodiments can be implemented in a variety of other forms; furthermore, various omissions, substitutions and changes can be made without departing from the essence of the invention. Embodiments and modifications thereof include those that can be easily conceived of by a person skilled in the art, those that are substantially the same, and those that are of equivalent scope.

For example, in the present embodiment, the outer peripheral bonding surface 41 of the spacer 4 and the inner circumferential surface 5a of the sleeve 5 are disposed on at least a part of a semi-circumferential portion on a side away from the rod body 10, but it can be disposed on the entire semi-circumference as in the above-described embodiment, or be non-continuous in the circumferential direction.

In the present embodiment, an example is shown in which the adhesive is used to fix the guide ring and the frame, but it is not limited to the adhesive, and the fixing method can be by swaging.

In the present embodiment, the direction away from the rod body 10 in the vertical direction from the protruding distal end side of the guide for a fishing rod is defined as the upper side, but this is a case in which the guide for a fishing rod is disposed on the upper side of the rod body for a dual bearing reel; however, in the case of a rod body for a spinning reel, the guide for a fishing rod is attached on the lower side of the rod body 10, so that, in this case, in the protruding distal end side of the guide for a fishing rod, the direction away from the rod body is the upper side.

In the present embodiment, a metal wire material is employed as the frame, but the frame can be made of sheet metal.

Further, in the present embodiment, the supporting leg portion 31 and the mounting leg portion 32 have a two-legged configuration, but they can have a one-legged configuration.

What is claimed is:

1. A guide for a fishing rod, comprising:
a guide ring defining an axial direction along a central axis of the guide ring and a circumferential direction along a circumference of the guide ring, the guide ring configured to have a fishing line inserted therethrough in the axial direction, and including an outer circumferential groove along an outer peripheral edge of the guide ring located outside of the central axis in a radial direction of the rod when the guide is fixed to a rod body of the fishing rod;
a guide frame configured to be fixed to the rod body and extending outwardly in the radial direction of the rod when the guide is fixed to the rod body and which has a frame comprising a ring-shaped wire material that holds the guide ring; and
a bonding assisting aid having a first bonding portion bonded to the outer circumferential groove, and a second bonding portion bonded to an inner circumferential surface of the frame, the bonding assisting aid defining a length in the circumferential direction of the guide ring between the first bonding portion and the second bonding portion, a distance between the first bonding portion and the second bonding portion being a same along an entirety of the length of the bonding assisting aid in the circumferential direction of the guide ring, the bonding assisting aid defining a width in the axial direction of the guide ring, and the distance between the first bonding portion and the second bonding portion being a same along an entirety of the width of the bonding assisting aid in the axial direction of the guide ring and the bonding assisting aid is curved so as to be convex radially inward as seen in cross section.

2. The guide for a fishing rod according to claim 1, wherein;
the first bonding portion has a shape that follows the outer circumferential groove, and is in frictional contact with the outer circumferential groove, and
the second bonding portion has a shape that follows a shape of the inner circumferential surface of the frame, and is in frictional contact with the inner circumferential surface of the frame.

3. The guide for a fishing rod according to claim 1, wherein;
the first bonding portion opposes the outer circumferential groove such that an adhesive is capable of being disposed therebetween, and
the second bonding portion has a shape that follows a shape of the inner circumferential surface of the frame, and is in frictional contact with the inner circumferential surface of the frame.

4. The guide for a fishing rod according to claim 1, wherein the bonding assisting aid is configured to cover the entire cross section of the frame.

5. The guide for a fishing rod according to claim 1, wherein the bonding assisting aid is disposed entirely within the outer circumferential groove of the guide ring.

6. The guide for a fishing rod according to claim 1, wherein the bonding assisting aid is disposed to entirely circumferentially surround the ring-shaped wire material.

* * * * *